United States Patent Office 3,197,696
Patented July 27, 1965

3,197,696
RADIO-FREQUENCY CIRCUIT ANALYZER FOR MEASURING INCIDENT AND REFLECTIVE WAVES INCLUDING A BIDIRECTIVE COUPLING DEVICE
Denis Bibo, New Shrewsbury, N.J.
(15 Orchard Road River Plaza, Red Bank, N.J.)
Filed Sept. 5, 1961, Ser. No. 136,713
3 Claims. (Cl. 324—58)

This invention relates to radio-frequency circuit analyzers and, while it is of a general application, it is particularly applicable to portable, field-type antenna circuit analyzers capable of detecting reflection losses in such a circuit over a wide range of frequencies.

It is well known that for optimum operation of a high-frequency wave-signal circuit including an antenna interconnected with a receiver or transmitter by a transmission line, the impedance of the antenna, the line, and the connected device should be the same; that is, there should be a uniform impedance from the antenna to and including the input or output circuit of the connected device. Any impedance mismatching in such a system causes a reflection of a portion of the incident wave and a loss of gain in the system.

It is also well known that in the case of certain wave-signal systems, particularly two-way mobile communication systems such as are used in taxicabs, police cars, etc., impedance mismatch is frequently encountered, due either to faulty installation or to subsequent mechanical misadjustment caused by vibration and mechanical shock imparted by the vehicle.

There have heretofore been proposed certain antenna circuit analyzers for measuring the relative values of the incident and reflected waves in such a circuit, which measurements are indicative of any impedance mismatching in the circuit, but these devices have been basically of the laboratory instrument type involving secondary coupled transmission lines, matching stub lines, mechanically adjustable coupling devices, etc., which can be operated only by skilled technical personnel.

It is an object of the invention to provide a new and improved radio-frequency circuit analyzer which is simple in mechanical construction, suitable for portable field use, and capable of being operated by unskilled personnel, particularly to facilitate the installation and maintenance of mobile, two-way communication equipment.

It is another object of the invention to provide a new and improved radio-frequency circuit analyzer, the operation of which is essentially independent of frequency over a very broad frequency range.

It is another object of the invention to provide a new and improved radio-frequency circuit analyzer in which the responses to the incident and reflected waves are substantially linear over a wide range of signal amplitudes.

In accordance with the invention, an apparatus for indicating the relative values of incident and reflected waves translated between a wave-signal source and a load device over a transmission line comprises an elongated coaxial bidirective coupling device adapted to be inserted in the line and having a characteristic impedance substantially equal to that of the line, and a pair of longitudinally spaced pick-up elements inserted in the coupling device and having couplings to at least one of the conductors of the coupling device of opposite sign, each of the pick-up elements having electrical constants related to the constants of the coupling device to provide a response substantially independent of frequency. The apparatus of the invention further includes a resistive impedance connected in series circuit with each of the pick-up elements and having a value to render the circuit substantially aperiodic and a pair of independent indicating circuits, each including a signal detector and coupled to one of the pick-up elements, whereby the values of the incident and reflected waves may be separately indicated. The term "transmission line," as used here and in the appended claims, is intended to include coaxial lines, single lines with ground returns, wave guides, and other equivalent wave-signal translating devices.

For a better understanding of the present invention, together with other and further objects thereof, reference is had to the following description taken in connection with the accompanying drawings, while its scope will be pointed out in the appended claims.

Referring now to the drawings:

FIG. 2 is a schematic circuit diagram of the indicating unit adapted to be connected to the unit of FIG. 1, while

Figure 1:
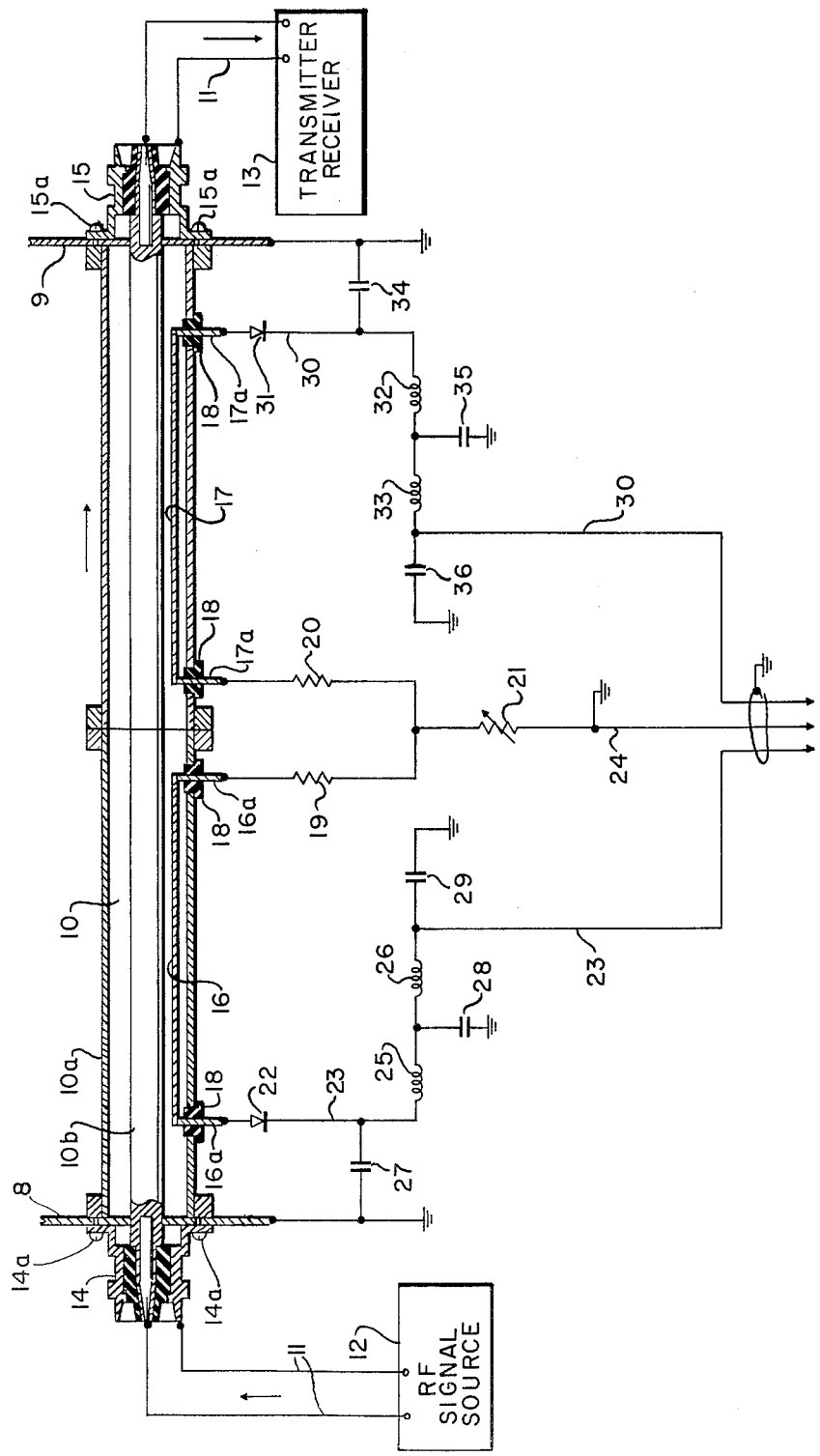
FIG. 1 is a cross-sectional detail of a bidirective coupling device constituting an element of the invention, together with a schematic representation of certain circuit elements associated therewith and preferably constituting one unit of the antenna analyzer of the invention.
Figure 2:
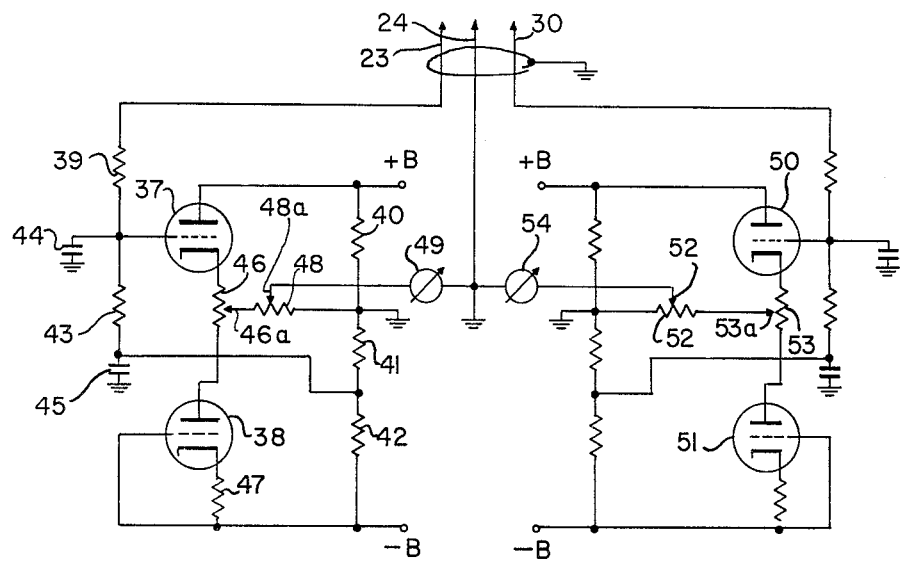

Referring now to FIGS. 1 and 2 of the drawings, there is represented an apparatus for indicating the relative values of incident and reflected waves transmitted between a radio-frequency wave-signal source and a load device over a transmission line. In FIG. 1 there is represented, in cross-sectional detail, an elongated coaxial bidirective coupling device 10 adapted to be inserted in a coaxial transmission line 11, 11, represented schematically, connected between a source 12 of radio-frequency wave signals, such as a receiving antenna or a signal generator, and a load device, such as a transmitter-receiver 13. The direction of signal travel from the unit 12 to the unit 13 is as indicated by the arrows. The coupling device 10 is designed to have a characteristic impedance substantially equal to that of the line 11, 11 in which it is inserted. The coupling device is itself a section of coaxial transmission line comprising an outer conductor 10a and an inner conductor 10b coaxially mounted and electrically insulated from each other by means of suitable coaxial connector elements 14 and 15. The coaxial connectors 14 and 15 are also preferably of the well-known matched impedance type and, per se, comprise no part of the present invention. The connectors 14, 15 are detachably secured to frame elements 8, 9, respectively, by means of cap screws 14a, 15a, respectively. By this means, one of the connectors may be readily removed to permit removal of the inner conductor 10b for replacement by another of different diameter so that the coupling device 10 may be matched to lines of different characteristic impedances.

A pair of longitudinally spaced pick-up loop elements 16 and 17 are inserted in the device 10 in such a manner that they do not significantly affect its characteristic impedance. The elements 16 and 17 are preferably in the form of elongated wires parallel to the axis of the device 10 and provided with external terminals 16a, 16a and 17a, 17a projecting through the outer conductor 10a through suitable insulating bushings 18. The pickup elements 16, 17 have reactive couplings to one or both of the conductors 10a, 10b of opposite sign; specifically, they have capacitive and inductive couplings with one or both of these conductors, the inductive couplings being of opposite sign.

The analyzer of the invention further includes a resistive impedance network connected in series circuit with each of the pick-up elements 16, 17 and having a value to render the circuits substantially aperiodic. The network may include a resistive impedance element or elements, such as resistors 19 and 20, connected in series between adjacent terminals 16a, 17a of the elements 16, 17, respectively, the junction of the resistors 19, 20 being connected to ground through an adjustable resistor 21, so that there is a resistive path between each of the terminals 16a and 17a and ground. The resistors 19, 20, and 21 preferably are of a type having a minimum inductance and distributed capacitance.

In order that the pick-up elements 16, 17 respond only to wave-signal energy traveling in a given direction, for example, so that the element 16 responds only to incident wave-signal energy transmitted from the source 12 and the element 17 responds only to reflected wave-signal energy, each of the pick-up elements 16, 17 has a capacitance to one or both of the conductors 10a, 10b and a mutual inductance therebetween so related to the characteristic impedance of the line and the value of the resistive impedance connected in series with each of the pick-up elements as to provide a response substantially independent of frequency. These electrical constants may be determined in accordance with Equations 1 through 6 of Patent 2,423,416 to Sontheimer et al. in order to provide this nonfrequency-selective response characteristic.

The radio-frequency circuit analyzer of the invention further comprises a pair of indicating circuits each including a signal detector and coupled to one of the pick-up elements 16, 17, whereby the value of the incident and reflected waves may be separately indicated. Specifically, the circuit of the pick-up element 16 includes a signal detector 22, which may be a diode of the semiconductor type, and a pair of output conductors 23 and 24, the latter being grounded as indicated. Included in the output conductor 23 are suitable radio-frequency chokes 25 and 26 and filter condensers 27, 28, and 29 to filter out all of the fluctuating components of the detected signal output of the element 16.

Similarly, the circuit of the pick-up element 17 includes an output conductor 30 including a signal detector 31, radio-frequency chokes 32 and 33, and filter condensers 34, 35, and 36. The pick-up element 17 has an output conductor 24 common to the pick-up element 16. As indicated, the output conductors 23, 24, and 30 are merged into a shielded cable for connection to the indicating circuits of FIG. 2.

The conductors 23 and 24 form the input circuit of one of the indicating circuits including a direct-coupled amplifier in the form of a differential amplifier consisting of suitable amplifying devices such as vacuum tubes 37 and 38 having their anode-cathode circuits connected in series across a suitable source +B, —B having a grounded neutral. The input conductor 23 is connected to the control grid of the tube 37 through a stabilizing resistor 39. A suitable bias is applied to the control grid of this tube through a voltage-divider comprising resistors 40, 41, and 42 and connected in series across the source +B, —B, this bias being applied through an isolating grid resistor 43, suitable filter condensers 44 and 45 being connected between opposite terminals of resistor 43 and ground.

The tubes 37 and 38 are provided with cathode load resistors 46 and 47, respectively, while the grid of the tube 38 is connected to the remote terminal of the cathode load resistor 47. The cathode load resistor 46 is shown as provided with an adjustable calibrating contact 46a which is connected through a resistor 48 to the junction of resistors 40 and 41 which is also grounded. The resistor 48 is provided with an adjustable contact 48a which is connected to ground through an indicating instrument such as a micro-ammeter 49. It will be apparent that, as the value of the rectified signal input to the tube 37 varies, the conductances of the tubes 37, 38 are varied in opposite senses. The difference between the anode-cathode currents of these tubes flows through resistor 48 and produces an amplified potential variation thereacross.

The indicating circuit connected to the pick-up element 17 is identical in circuit configuration and in values of circuit elements to that just described so that it need not be separately described except to indicate that it comprises tubes 50 and 51 connected in a similar direct-coupled differential amplifier arrangement, this circuit having a calibrating resistor 52 connected to an adjustable tap of cathode resistor 53 of tube 50 and being provided with an indicator, such as a micro-ammeter 54, connected between the adjustable tap 52a of resistor 52 and ground.

Figure 3:
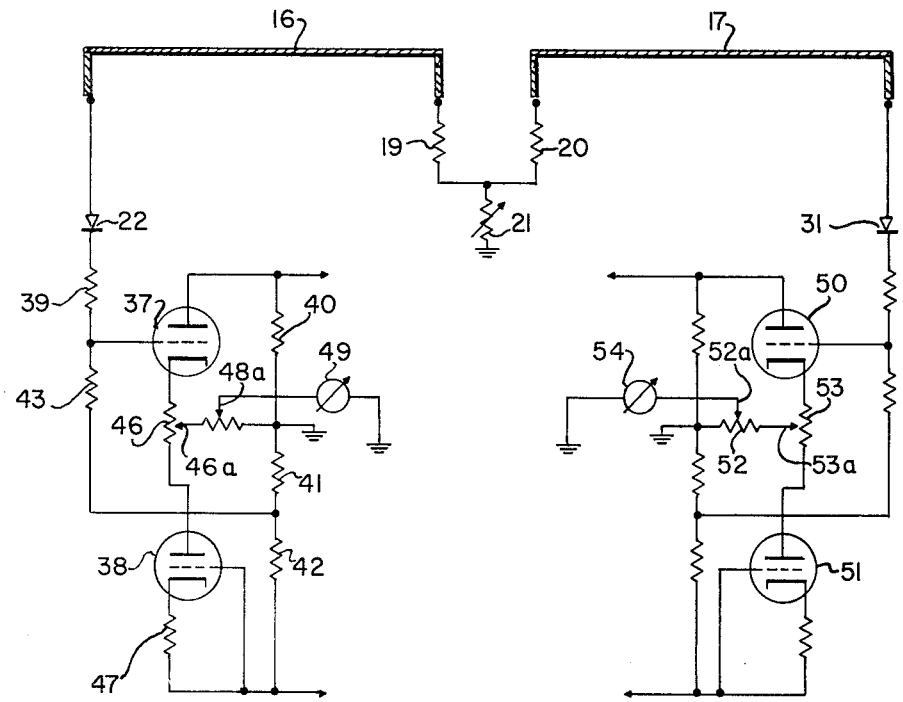
FIG. 3 is a schematic diagram of the complete system of FIGS. 1 and 2 to aid in explanation of the invention.

In explaining the operation of the radio-frequency circuit analyzer described, reference is made to FIG. 3 which is a schematic representation of FIGS. 1 and 2, including only the essential elements of the circuit. It is seen that the signal developed by the pick-up element 16 which, as stated above, is responsive only to the incident wave, is rectified by the detector 22 and amplified in the differential amplifier 37, 38, the output appearing across the load resistor 48. An adjustable portion of this rectified output is selected by the adjustable contacts 46a and 48a and applied to the indicating meter 49. It is understood that what is significant is not a measurement of the absolute amplitude of the incident wave but only of the relative amplitudes of the incident and reflected waves. In a similar manner, the indicating meter 54 associated with the pick-up element 17 thus gives an indication of the relative amplitude of the reflected wave.

It is believed that the manner in which the relative values of the incident and reflected waves are indicated and utilized can be best explained by reference to the manner in which the analyzer is initially set up and calibrated.

Power is initially applied to the indicating unit of FIG. 2 and to the unit 13 by any conventional means (not shown) and the system is allowed to warm up as in the case of any vacuum tube apparatus. The potentiometers 48 and 52 are set to their midpoints, which may be an assumed reading of 5, and the potentiometers 46, 53 are adjusted until the meters 49 and 54 both read zero, indicating that the amplifiers 37, 38 and 50, 51 are balanced. The signal generator 12 or other source is then turned on and the potentiometer 48 is adjusted to increase the gain of the amplifiers 37, 38 until the meter 49 reads full scale, for example 100. Adjustment of the potentiometer 48 is then noted and potentiometer 52 is adjusted to an identical setting and the meters 49, 54 are read. It is apparent that, under these conditions, the meter 49 indicates the relative amplitude of the incident wave from the source 12 as picked up by the element 16 and, on the same scale, the meter 54 indicates the relative amplitude of the wave reflected from the unit 13 as picked up by the element 17. The VSWR is then determined as $$\frac{M_1+M_2}{M_1-M_2}$$

where $M_1$ and $M_2$ are readings of the meters 49 and 54, respectively. The adjustable resistor 21 serves as a reactance indicator and is so calibrated that, when adjusted, its mid-value is equal to the characteristic impedance of the coupling device 10 when there is substantially no reflection from the unit 13. If reflection is present, the resistor 21 may be adjusted from its mid-value in one sense or the other until a minimum reading is obtained on meter 54, the sense of such adjustment giving an indication of whether the circuit of unit 13 is capacitive or inductive.

Obviously, if there is no impedance mismatch in the system, the VSWR is unity, as indicated by a zero reading of the meter 54. If the VSWR is found to have an objectionable value, the electrical connections of the source 12 to the line 11 and from the line 11 to the unit 13 are inspected and adjusted until a minimum reading is obtained on the meter 54, representing a minimum of reflection and the maximum gain of which the system is capable. On the other hand, if the foregoing procedure indicates a minimum VSWR but a greater adjustment of the tap 48a of resistor 48 is required to obtain a full scale reading of meter 49, trouble is indicated as being in the source 12.

The apparatus described is also useful in measuring the resonant frequency of an antenna system, for example, by replacing the source 12 by a variable-frequency oscillator and replacing the unit 13 with an antenna to be measured. Following the procedure given above, the variable-frequency oscillator is adjusted until a minimum reading is obtained on the meter 54 and that oscillator frequency is the desired antenna resonant frequency. Other measurements may be made by means of the apparatus described which involve basically the measurement of the VSWR which is representative of impedance mismatch in the system.

While the invention is applicable to analyzers having a wide range of characteristics, there follow the essential circuit parameters of one design giving satisfactory performance over a frequency range of 2 to 1000 mc.:

| Component | Value |
|---|---|
| Coupling device 10 | bidirective coupler, $Z_0$=32–135 ohms. |
| Pick-up elements 16, 17 | No. 26 gauge silverplated copper wire 2¾ inches long spaced 1/32 inch from outer conductor. |
| Detectors 22, 31 | 1N252 diodes (matched pair). |
| Resistors 19, 20 | 100 ohms. |
| Resistor 21 | 50-ohm linear tapered potentiometer. |
| Resistor 39 | 1 megohm. |
| Resistor 43 | 2.5 megohms. |
| Resistors 46, 53 | 1 kilohm linear tapered potentiometer. |
| Resistors 48, 52 | 10 kilohm, 10-turn precision wire-wound potentiometers with dial counter verniers. |
| Tubes 37, 38, 50, 51 | Each ½ 12 AT7 (matched pair). |
| Meters 49, 54 | Precision shielded microammeters, range 0–100μa. |

In the bidirective coupler 10 illustrated and described, the center conductor may be made readily interchangeable, permitting the insertion of the bidirective coupler in lines having different characteristic impedances. In addition, separate power supplies are preferably provided for the two direct-current amplifiers of FIG. 2 to avoid any cross-coupling between them.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An apparatus for indicating the relative values of incident and reflected waves translated between a radio-frequency wave-signal source and a load device over a transmission line, comprising: an elongated coaxial bi-directive coupling device adapted to be inserted in said line and having inner and outer conductors and a characteristic impedance substantially equal to that of the line; a pair of longitudinally spaced pick-up elements inserted in said bidirective coupling device and having couplings of opposite polarity to at least one of the conductors of said bidirective coupling device, each of said elements having electrical constants related to the constants of said device to provide a response substantially independent of frequency; a resistive impedance connected in series circuit with each of said pick-up elements and having a value to render the circuit substantially aperiodic and having a common terminal; a third resistive impedance connected between said common terminal and ground and having a value approximately the characteristic impedance of the line; and a pair of independent indicating circuits, each including a signal detector and coupled to one of said pick-up elements, whereby the values of the incident and reflected waves may be separately indicated simultaneously.

2. An apparatus for indicating the relative values of incident and reflected waves translated between a wave-signal source and a load device over a transmission line, comprising: an elongated coaxial bidirective coupling device adapted to be inserted in said line and having inner and outer conductors and a characteristic impedance substantially equal to that of the line; a pair of longitudinally spaced pick-up elements inserted in said bidirective coupling device and having couplings of opposite polarity to at least one of the conductors of said bidirective coupling device each of said elements having electrical constants related to the constants of said device to provide a response substantially independent of frequency; a resistive impedance connected in series circuit with each of said pick-up elements and having a value to render the circuit substantially aperiodic and having a common terminal; a third resistive impedance connected between said common terminal and ground and having a value approximating the characteristic impedance of the line; and a pair of independent indicating circuits individually coupled to said pick-up elements, each including a signal detector, a direct-current amplifier, and an indicating device, whereby the values of the incident and reflected waves may be separately indicated simultaneously.

3. An apparatus for indicating the relative values of incident and reflected waves translated between a wave-signal source and a load device over a transmission line, comprising: an elongated coaxial bidirective coupling device adapted to be inserted in said line and having inner and outer conductors and a characteristic impedance substantially equal to that of the line; a pair of longitudinally spaced pick-up elements inserted in said bidirective coupling device and having couplings of opposite polarity to at least one of the conductors of said bidirective coupling device, each of said elements having electrical constants related to the constants of said device to provide a response substantially independent of frequency; a resistive impedance network connected in series circuit with each of said pick-up elements and including a pair of elements interconnecting adjacent ends of said pick-up elements and having values to render the circuit substantially aperiodic and including also an adjustable element connected from the junction of said pair of elements to ground; and a pair of independent indicating circuits, each including a signal detector and coupled to one of said pick-up elements, whereby the values of the incident and reflected waves may be separately indicated and the adjustment of said adjustable resistive element gives an indication of the reactance of said load device.

References Cited by the Examiner

UNITED STATES PATENTS

| | | | |
|---|---|---|---|
| 2,412,393 | 12/46 | Ghosh | 324—58 |
| 2,562,281 | 7/51 | Mumford | 324—58 X |
| 2,797,387 | 6/57 | Adams et al. | 324—58 |
| 2,884,595 | 4/59 | Stevens | 324—95 |
| 2,925,556 | 2/60 | Schimmel | 324—95 |
| 2,936,417 | 5/60 | Hedburg | 324—95 |
| 3,020,529 | 2/62 | Turner | 324—95 X |

WALTER L. CARLSON, *Primary Examiner.*